United States Patent [19]
Clayton

[11] 3,973,063
[45] Aug. 3, 1976

[54] SPOT BLOCKED THERMOPLASTIC FILM LAMINATE

[75] Inventor: William Joseph Clayton, Fairport, N.Y.

[73] Assignee: Mobil Oil Corporation, New York, N.Y.

[22] Filed: Nov. 21, 1974

[21] Appl. No.: 525,894

[52] U.S. Cl. .............................. 428/35; 156/209; 156/272; 264/284; 428/167; 428/172; 428/195
[51] Int. Cl.² .............................................. B32B 3/00
[58] Field of Search ........... 161/116, 121, 123, 147, 161/149, DIG. 3; 428/156, 167, 163, 198, 195, 35, 172; 264/284, 293; 156/209, 219–222, 272

[56] References Cited
UNITED STATES PATENTS

| | | | |
|---|---|---|---|
| 2,633,442 | 3/1953 | Caldwell | 156/197 |
| 3,011,930 | 12/1961 | Dworak | 161/127 |
| 3,081,571 | 3/1963 | Dayen et al. | 156/272 |
| 3,308,227 | 3/1967 | Power et al. | 264/284 |
| 3,466,212 | 9/1969 | Clayton et al. | 156/272 |
| 3,507,943 | 4/1970 | Such et al. | 264/103 |
| 3,516,887 | 6/1970 | Jones | 156/272 |
| 3,743,172 | 7/1973 | Ackley et al. | 161/131 |

FOREIGN PATENTS OR APPLICATIONS
1,094,480  12/1967  United Kingdom ................. 428/198

Primary Examiner—Marion E. McCamish
Assistant Examiner—P. J. Thibodeau
Attorney, Agent, or Firm—Charles A. Huggett; Hastings S. Trigg

[57] ABSTRACT

There is provided a laminate of at lest two thermoplastic films which has a plurality of embossed parallel ribs running in at least one direction, said films being blocked together at spaced apart spots along each rib. Such laminate is prepared by passing at least two thermoplastic films in a superimposed and contacting engagement with one another through the nip of a pair of rollers. One roller is provided with a plurality of parallel raised ribs running in one direction and the other roller is provided with a plurality of parallel raised ribs which run in a direction angled to the direction of the ribs on the first roller. At the locations where the ribs on each roller cross at the nip, the films in the laminate are blocked together but otherwise remain unattached. Such laminates have exceptionally high tear strength and added stiffness and are adapted for various uses, including heavy duty bags and grocery sacks.

7 Claims, 9 Drawing Figures

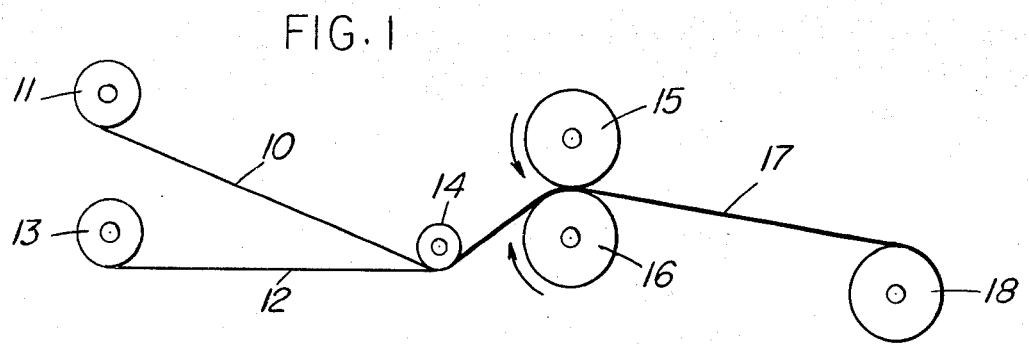
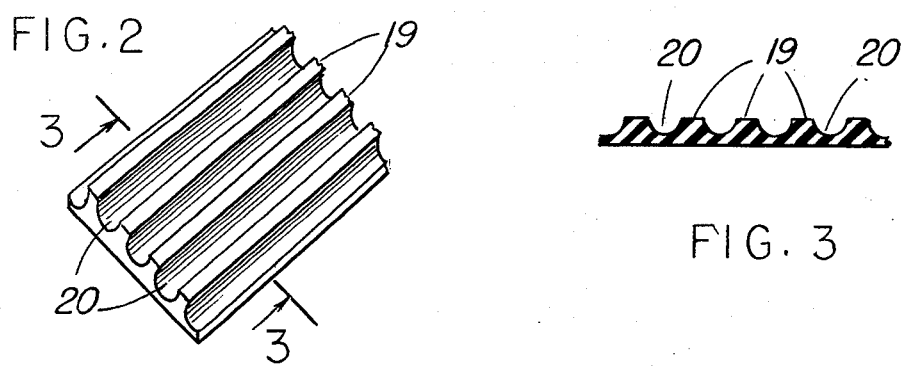
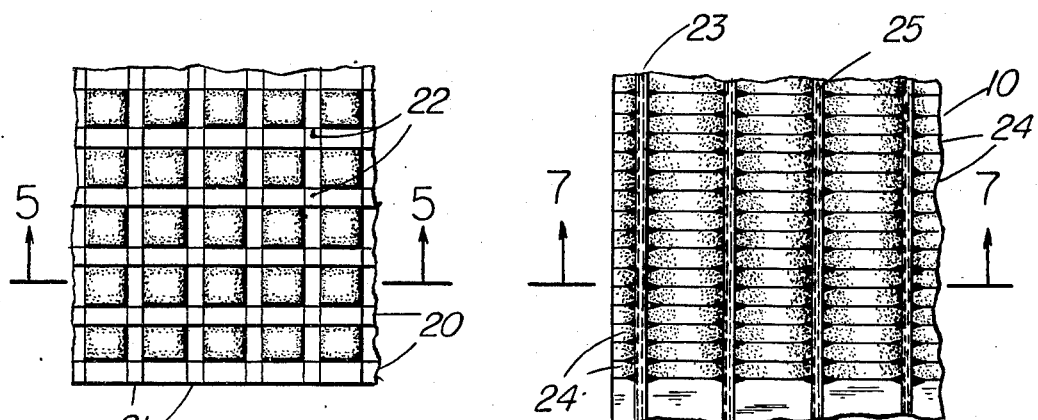
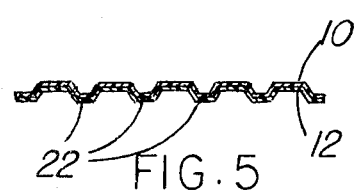
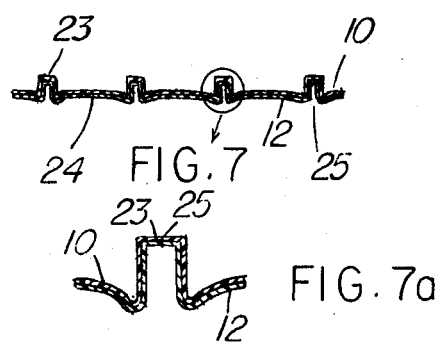

SPOT BLOCKED THERMOPLASTIC FILM LAMINATE

BACKGROUND OF THE INVENTION

1. Field of the Invention

This invention relates to spot blocked ribbed laminates of thermoplastic films, to the method of making them, and to bags and sacks formed with them.

2. Description of the Prior Art

In U.S. Pat. No. 3,530,023, there is described laminated cellulosic sheet material made by securing together at least two layers of cellulosic fiber sheet material at a plurality of spaced points. These laminates are permanently sealed together at the points and are characterized by being flexible. The laminates of this invention are blocked together not sealed, at the points of attachment and, by the inclusion of embossed ribs, have increased stiffness.

The laminates of this invention differ from quilted laminates, such as described in U.S. Pat. No. 3,466,212, in that it does not have entrapped air pockets, because they have no continuous crisscrossing seal lines. Accordingly, it is much stiffer, because there are no lines in which bending can take place and it has far greater tear resistance, because the layers are free to tear separately.

SUMMARY OF THE INVENTION

This invention provides a laminate of at least two films having a plurality of parallel embossed ribs running in at least one direction, said films being blocked together at spaced apart spots along each rib.

It also provides a method for producing a laminate that comprises bringing at least two thermoplastic films in a superimposed and contacting engagement and passing the superimposed films through the nip of a pair of rollers; one of said rollers having a plurality of parallel raised ribs angled in one direction and the other roller having a plurality of parallel raised ribs angled in a different direction.

The invention also provides heavy duty bags and grocery sacks made from the aforedescribed laminate.

DESCRIPTION OF THE DRAWINGS

In the drawings, FIG. 1 presents a highly diagrammatic side view elevation of an apparatus suitable for practicing the process of this invention.

FIG. 2 presents a perspective view of a part of a typical raised ribbed roll surface pattern which can be employed to practice the process of this invention.

FIG. 3 presents a cross sectional view of the pattern taken along the line 3—3 of FIG. 2.

FIG. 4 presents a plan view of a typical laminate of this invention.

FIG. 5 presents a cross sectional view of the laminate taken along line 5—5 of FIG. 4.

FIG. 6 presents another typical laminate pattern of this invention and,

FIG. 7 presents a cross sectional view of the laminate taken along line 7—7 of FIG. 6.

DESCRIPTION OF SPECIFIC EMBODIMENTS

Figure 8:
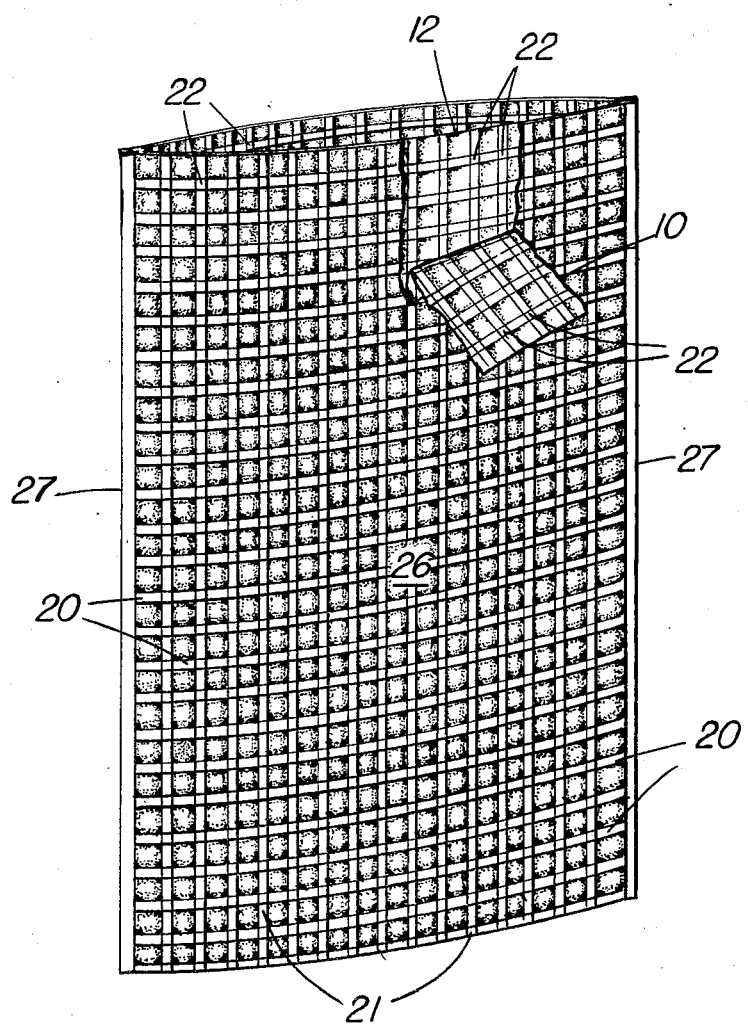
FIG. 8 presents a perspective view of a typical bag made from the laminate of this invention.

Referring specifically to FIG. 1, the process of this invention is demonstrated in an embodiment of a 2-layer film laminate. In operation, a thermoplastic film 10 from a continuous film supply roller 11 and another thermoplastic film 12 from a continuous film supply roller 13 are superimposed and engaged and passed under a guide roller 14 and thence through the nip of embossing rollers 15 and 16, which rotate counter to each other. Upon passing through the nip of rollers 15 and 16 the films are embossed and spot blocked to form a laminate 17, as hereinafter described. The laminate is then passed to a take-up roller 18 to further processing.

As shown in FIGS. 2 and 3, the rollers 15 and 16 are covered with a pattern of parallel continuous ribs 19 that are separated by valleys 20. In the embodiment shown, the ribs on one roll, for example roller 15, run longitudinally of the roller and the ribs on the other roller 16 run in a direction 90° of the ribs on roller 15, i.e., circumferentially. The ribs on the surface of both the rollers can be made of a resilient material. In another embodiment, however, the ribs on at least one roller can be of a resilient material but the ribs on the other roller can be made of a non-resilient material, such as steel. In a further embodiment, the ribs on both rollers can be made of non-resilient material.

FIG. 4 shows a plan view of the typical pattern laminate obtained when both rollers 15 and 16 have a resilient rib surface. The longitudinal ribs on roller 15 compress into both films 10 and 12 a plurality of spaced apart ribs 20. The circumferential ribs on roller 16 compress upon both films a plurality of ribs 21 running at 90° to the other ribs 20. At the points 22 where the longitudinal and circumferential ribs cross each other, the films are blocked together but remain otherwise unattached. Due to the compression between the rollers of the resilient surfaces and the heat of the rollers, the film is slightly distorted as can be seen particularly in FIG. 5. Accordingly, the laminate in this embodiment has a plurality of parallel and crossing ribs embossed therein and, along each rib line where the ribs cross, there are formed a plurality of spot blocks along the rib.

In the practice of the process of this invention, the temperature of the rollers must be controlled in relation to the speed of the film being passed through the nip so that the films do not attain a temperature sufficiently high to cause heat sealing. Heat sealing in this operation is undesirable. Accordingly, the temperature of the films should be no higher than that sufficient to emboss the film and cause spot blocking along the rib lines. Suitable film temperature will be between about 25° and about 10°F. below the melting point of the polymer from which the film has been made. In the case of low density polyethylene (LDPE) and medium density polyethylene (MDPE) satisfactory blocking has been achieved when one of the rollers is set at a temperature of about 240°F. and the other at about 180°F. The actual surface temperature of the films being processed was estimated to be about 40° cooler than the temperature of the higher temperature roller, i.e., about 200°F.

As will be understood by those skilled in the art, the temperatures at which the rollers are set can vary depending upon the throughput feed and also upon the type of polymer being processed. The process is sufficiently flexible so that laminates can be formed in which all the film layers are made of the same material or the film layers can be made of different materials, in order to take advantage of specific properties of the various polymers utilizable. Typical polymers utilizable include LDPE, MDPE, HDPE, polypropylene, polybutene, PVC, vinyl acetate, polyamides, and other thermoplastic polymers capable of blocking according to this invention. The films can be clear or they can be pigmented. It is also contemplated to use combinations of clear and pigmented films.

In the examples shown so far, the ribs on each roller were of the same dimension and crossed at a 90° angle. It will be apparent, however, that the ribs can cross at any angle so long as they do not become parallel to each other. Furthermore, the ribs from both rollers do not have to have the same dimensions. A pair of rib structures having dissimilar dimensions is utilizable. Also, the ribs do not necessarily have to run longitudinally and circumferentially of the rolls. Again, the ribs can be placed around the rollers at any angle so long as they do not become parallel.

In addition to the feasibility of using films made of different polymers, the laminates can be formed in which the machine direction grain of all the layers are in the same direction, i.e., in 0° orientation. Alternatively, the film layers can alternate with their machine direction grain at right angles, i.e., at 90° orientation. Another alternative is to use films produced by use of a rotating die so that the grain will run either 15° to the right of the machine direction or 15° to the left of the machine direction, i.e., at a ± 15° orientation.

A series of laminates was prepared by the process of this invention using rubber mats with parallel ribs in both rollers set at 90° angles to each other. In one rib pattern, called the fine pattern, the ribs were approximately 1/16 inch wide and spaced about one eighth inch apart. In another rib pattern, called the course pattern, the ribs were about one eighth inch in width and spaced about one fourth inch apart. Of the laminates, some were oriented at ±15° while others were oriented at 90° and the bonding pattern was varied as well as the number of film layers. Each film used was 1.5 mils in thickness. For control and comparison purposes, were used HDPE films of 7 mils and 9 mils thickness. Each film or laminate was subjected to the Elmendorf tear test [ASTM Designation D-1922-67/(1972)]. The results are set forth in Table I, as are the data on the resin orientation, bonding pattern, and number of films in the laminates.

a standard material commonly used in heavy duty bags. Particularly, in the case of 6 mil laminates using LDPE, the tear resistance was approximately four times that of the HDPE 9 mil film. It will be at once apparent that this means that a more snag resistance bag can be made out of the 6 mil polyethylene laminate than the standard 9 mil single film. The major advantage of this is that 30 – 40% less resin is required to make laminates in accordance with this invention having high tear resistance. Further, because the laminate is made up of 2 or more layers of film, it is possible to use an inner film having a slip additive for easy opening and an outside layer with a tack additive to prevent slipping when stacked.

FIG. 6 shows a plan view of the typical laminate pattern obtained when only one roller has a resilient rib surface and the other roller has a non-yielding rib surface. In this embodiment, roller 15 had a plurality of spaced apart ribs made of a non-yielding substance such as steel. The roller 16 was provided with a plurality of longitudinal ribs of a resilient material. In this embodiment the non-yielding ribs on roller 15 compress into both films 10 and 12 a plurality of spaced apart ribs 23. The longitudinal ribs on roller 16 compress into both films 10 and 12 a plurality of spaced apart ribs 24. At the points 25 where the longitudinal and circumferential ribs cross each other, the films are blocked together but remain otherwise unattached. Due to the compression between the rollers and the heat of the rollers, the film is slightly distorted, as can be seen particularly in FIG. 7 and in enlarged detail in FIG. 7A. If the circumferential ribs on roller 15 are spaced sufficiently apart, the ribs 24 compressed by the longitudinal ribs on roller 16 will not appear to be continuous on the laminate surface. Accordingly, in such an embodiment, the plurality of embossed parallel ribs will run continuously in only one direction.

In order to demonstrate the stiffness obtained with the laminates produced in accordance with this invention, two samples were subjected to a beam deflection test following a procedure, such as set forth in ASTM Designation D 790-71, using 4 inch × 4 inch specimens. The one sample was made using the coarse pattern described hereinbefore wherein the surfaces on both rollers were resilient. The other sample was made using

TABLE I

ELMENDORF TEAR FOR SPOT BLOCKED POLYETHYLENE LAMINATES

| Resin | Angle of Orientation | Blocking Pattern | No. of Layers | Overall Gauge | Tear in Kilograms MD | TD |
|---|---|---|---|---|---|---|
| HDPE (as control) | 0° | None | 1 | 7 | 0.40 | 0.62 |
|  |  |  |  |  | 0.41 | 0.67 |
| HDPE (as control) | 0° | None | 1 | 9 | 0.65 1.48 |  |
| LDPE | ±15° | Coarse | 2 | 3 | 0.30 |  |
| (M.I.=2) | ±15° | Coarse | 4 | 6 | 1.29 |  |
| LDPE(M.I.=0.3) | 90° | Fine | 4 | 6 | 2.52 | 2.34 |
| LDPE (M.I.=2) | 90° | Coarse | 4 | 6 | 2.75 | 2.52 |
|  | ±15° | Fine | 4 | 6 | 1.68 | 1.40 |
|  | 90° | Fine | 4 | 6 | 0.91 | 0.91 |
|  | 90° | Coarse | 4 | 6 | 0.96 | 0.96 |
|  | 90° | Fine | 4 | 6 | 0.96 | 1.56 |
|  | 90° | Coarse | 4 | 6 | 0.96 | 1.56 |
| MDPE | 90° | Fine | 2 | 3 | 0.15 | 0.15 |
|  | 90° | Coarse | 2 | 3 | 0.24 | 0.24 |
| MDPE | ±15° | Coarse | 2 | 3 | M.D. | |
|  |  |  |  |  | 3.07 | 2.72 |
| LDPE |  |  | 1 | 1.5 | L.D. | |

From the data in Table I, it will be noted that 6 mil laminates in general showed snag resistant equal to or greater than that of the high density 9 mil film which is a "corduroy" pattern in which one roller had circumferential steel ribs about one eighth inch wide and spaced about one half inch apart. The other rollers had longitudinal ribs of rubber mat in which the ribs were approximately 1/16 inch wide and spaced about one eighth inch apart. Both laminate samples were prepared using a 1.5 mil medium density polyethylene film and a 1.0 mil high density polyethylene film oriented at 90°. For comparison purposes, tests were also run on plain 2.5 mil film. The test results are set forth in Table II.

TABLE II

|  | BEAM DEFLECTION | |
| --- | --- | --- |
|  | MD | TD |
| "Coarse" pattern | 9.6 | 5.8 |
| "Corduroy" pattern | 14.8 | 3.1 |
| Plain 2.5 mil film (est.) | 2 | |

From the data in Table II, it will be noted that the laminate having the coarse pattern showed about 500% increase in the stiffness in the machine direction and about 300% increase in stiffness in the transverse direction. The laminate having the corduroy pattern showed about 700% increase in stiffness in the machine direction, but only about 50% increase in stiffness in the transverse direction, because the transverse ribs were not continuous across the film due to the spacing of the machine direction ribs.

As indicated hereinbefore, the laminates of this invention are suited for uses such as bags or sacks. A typical bag structure is shown in FIG. 8, wherein components are numbered as hereinbefore whereever possible. In the structure shown, the bag 26 is formed from a 2-ply laminate as shown in FIG. 4. The bag is made by folding a length of laminate to form a continuous (seamless) bottom portion and applying heat seals 27 at the sides. As will be apparent to those skilled in the art, other bag configurations can be used. For example the bag or sack can have a flat square bottom and side wall gussets.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:
1. A laminate of at least two thermoplastic films having a plurality of parallel embossed ribs running in at least one direction, said films being blocked together at spaced apart spots along each rib, whereby said films are joined discontinuously.
2. A laminate as defined in claim 1, wherein one set of parallel embossed ribs are disposed in one direction and another set of parallel embossed ribs are disposed in another direction.
3. A laminate as defined in claim 2, wherein one set of parallel ribs crosses another set of parallel ribs at a 90° angle.
4. A laminate as defined in claim 1, wherein said thermoplastic films are polyethylene films.
5. Bags and sacks formed from the laminate defined in claim 1.
6. Bags and sacks formed from the laminate defined in claim 3.
7. Bags and sacks formed from the laminate defined in claim 4.

* * * * *

UNITED STATES PATENT AND TRADEMARK OFFICE
CERTIFICATE OF CORRECTION

PATENT NO. : 3,973,063
DATED : August 3, 1976
INVENTOR(S) : William Joseph Clayton It is certified that error appears in the above-identified patent and that said Letters Patent are hereby corrected as shown below:

| | |
|---|---|
| Abstract, line 1 | "lest" should be --least--. |
| Col. 4, Table 1 | "0.65 down to $\genfrac{}{}{0pt}{}{MD}{LD}\bigg\{3.07$" should be under MD column after --0.41--. |
| Col. 4, Table 1 | "1.48 down to 0.24" should be under --TD column--. |

Signed and Sealed this

Twenty-second Day of February 1977

[SEAL]

Attest:

RUTH C. MASON
*Attesting Officer*

C. MARSHALL DANN
*Commissioner of Patents and Trademarks*